(12) United States Patent
Choi et al.

(10) Patent No.: US 10,158,258 B2
(45) Date of Patent: Dec. 18, 2018

(54) BEAMFORMING METHOD FOR MICROWAVE POWER TRANSMISSION AND APPARATUS FOR SENDING MICROWAVES FOR POWER TRANSMISSION BASED ON BEAMFORMING

(71) Applicant: RESEARCH & BUSINESS FOUNDATION SUNGKYUNKWAN UNIVERSITY, Suwon-si (KR)

(72) Inventors: Kae Won Choi, Seongnam-si (KR); Dong In Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/692,368

(22) Filed: Aug. 31, 2017

(65) Prior Publication Data

US 2018/0145542 A1 May 24, 2018

(30) Foreign Application Priority Data

Nov. 21, 2016 (KR) ........................ 10-2016-0154859

(51) Int. Cl.

| H04B 17/12 | (2015.01) |
| H02J 50/20 | (2016.01) |
| H02J 50/23 | (2016.01) |
| H02J 7/02 | (2016.01) |
| H04B 7/06 | (2006.01) |
| G01S 5/02 | (2010.01) |
| H04B 7/0426 | (2017.01) |

(52) U.S. Cl.
CPC .............. *H02J 50/23* (2016.02); *H02J 7/025* (2013.01); *H04B 7/0617* (2013.01); *G01S 5/0294* (2013.01); *H04B 7/043* (2013.01)

(58) Field of Classification Search
CPC ........ H04B 17/00; H04B 17/10; H04B 17/11; H04B 17/12; H04W 4/00; H04W 72/04; H02J 50/20; H02J 50/23

See application file for complete search history.

(56) References Cited

U.S. PATENT DOCUMENTS

| 8,422,961 | B2 * | 4/2013 | Kafle | ...................... H01Q 3/26 |
| | | | | 342/368 |
| 2015/0289147 | A1 * | 10/2015 | Lou | ...................... H04B 7/0408 |
| | | | | 370/329 |
| 2016/0049823 | A1 * | 2/2016 | Stein | ...................... H02J 7/025 |
| | | | | 320/108 |

FOREIGN PATENT DOCUMENTS

| JP | 2012-217323 A | 11/2012 |
| KR | 10-2008-0087211 A | 10/2008 |
| KR | 10-2011-0131954 A | 12/2011 |

OTHER PUBLICATIONS

Korean Office Action dated Nov. 21, 2017, in corresponding Korean Application No. 10-2016-0154859 (5 pages, in Korean).

* cited by examiner

*Primary Examiner* — Blane Jackson
(74) *Attorney, Agent, or Firm* — NSIP Law

(57) ABSTRACT

Disclosed is a beamforming method for microwave power transmission. The beamforming method includes sending, by a transmitter, microwaves to each training slot based on a random phase through antennas, receiving from a receiver, by the transmitter, a power measurement value for each of the training slots, estimating, by the transmitter, a channel using the received power measurement value, and determining, by the transmitter, beamforming weight based on information about the estimated channel.

15 Claims, 2 Drawing Sheets

[FIG. 1]
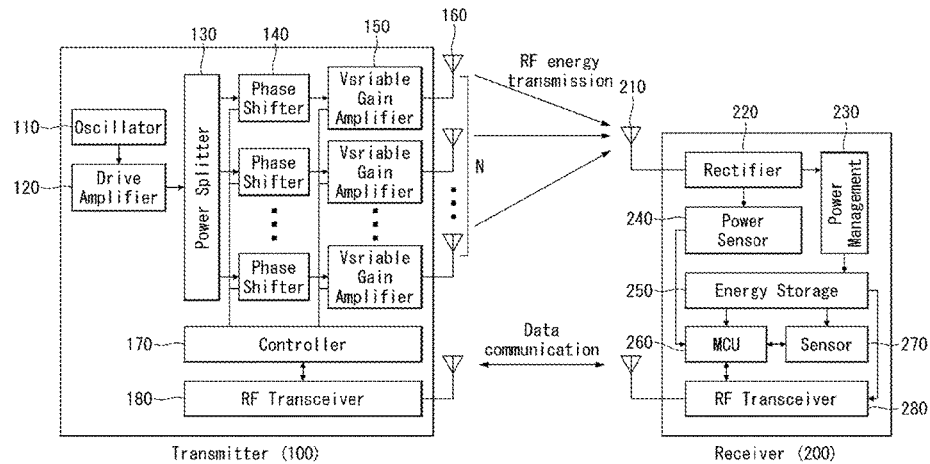
[FIG. 2]
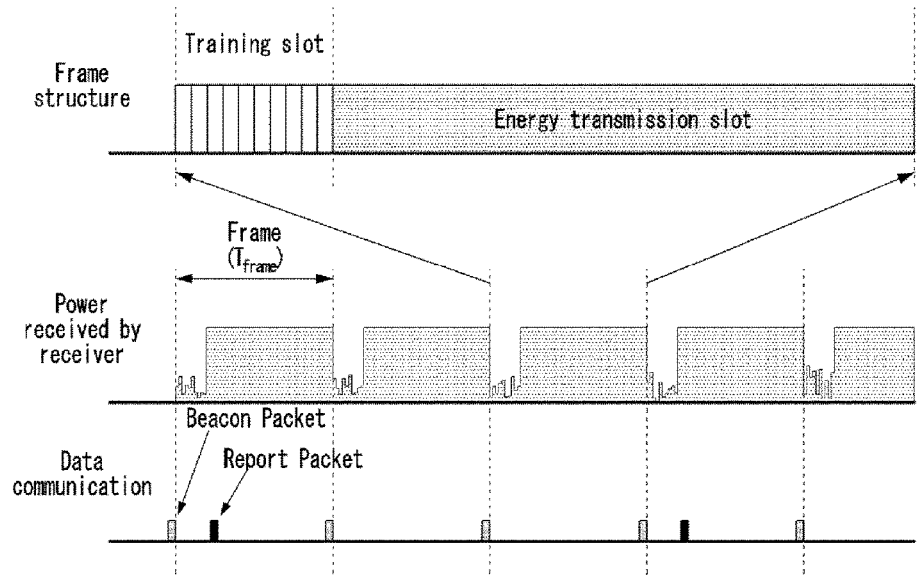

[FIG. 3]
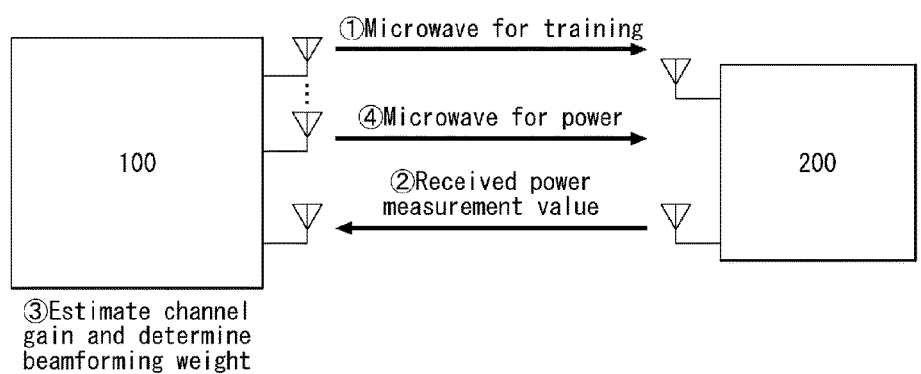

BEAMFORMING METHOD FOR MICROWAVE POWER TRANSMISSION AND APPARATUS FOR SENDING MICROWAVES FOR POWER TRANSMISSION BASED ON BEAMFORMING

CROSS-REFERENCE TO RELATED APPLICATION(S)

This application claims the benefit under 35 USC § 119(a) of Korean Patent Application No. 10-2016-0154859 filed on Nov. 21, 2016, in the Korean Intellectual Property Office, the entire disclosure of which is incorporated herein by reference for all purposes.

BACKGROUND

1. Field

The following description relates to a beamforming scheme for microwave power transmission.

2. Description of Related Art

A beamforming scheme is used to improve data transfer efficiency in wireless communication. A channel gain estimation scheme for beamforming may be divided into two types. The first type is a time reversal scheme in which a transmitter measures a microwave signal transmitted by a receiver and either checks the location of the receiver using direction-of-arrival (DOA) estimation or measures a channel gain up to the receiver using channel reciprocity. The second type is a scheme in which a transmitter controls its microwave phase based on whether the amount of received power at a receiver has been increased or not. In summary, in a conventional scheme, a beam is steered by checking the location of a receiver based on information transmitted by the receiver.

The time reversal scheme requires a very complicated hardware structure. A phase detector for measuring the phase of a signal from a receiver is used for a plurality of antennas deployed in a transmitter. Furthermore, a circuit for sending a microwave signal is also used for the receiver. In order to send a microwave signal, active circuit elements, such as a phase-locked loop and a local oscillator including a power amplifier, are typically included. Accordingly, energy consumption at the receiver can be significantly increased. The scheme for performing beamforming depending on whether the amount of received power at the receiver has been increased or not has a disadvantage in that a beamforming speed is very slow if it is used solely.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology described below is to perform beamforming for microwave power transmission by estimating a channel gain based on the received power measured by a receiver.

A beamforming method includes sending, by a transmitter, microwaves to each training slot based on a random phase through antennas, receiving from a receiver, by the transmitter, a power measurement value for each of the training slots, estimating, by the transmitter, a channel using the received power measurement value, and determining, by the transmitter, beamforming weight based on information about the estimated channel.

An apparatus for sending microwaves for power transmission based on beamforming includes antennas configured to send microwaves in each training slot based on a random phase, an RF receiver configured to receive a power measurement value from a receiver, and a controller configured to estimate a channel using the received power measurement values and to determine beamforming weight for beamforming based on information about the estimated channel.

Other features and aspects will be apparent from the following detailed description, the drawings, and the claims.

BRIEF DESCRIPTION OF THE DRAWINGS

FIG. 1 is a block diagram illustrating an example of an apparatus for sending power using microwaves.

FIG. 2 is a diagram illustrating an example of a protocol structure for sending power based on microwaves.

FIG. 3 is a diagram illustrating an example of a process of performing beamforming for microwave power transmission, using the apparatus of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Prior to a detailed description of the drawings, it is evident that the elements in this specification have been merely classified according to a main function managed by each element. That is, two or more elements to be described below may be merged into one element or one element may be divided into two or more elements for each more subdivided function. Furthermore, each of the elements to be described below may additionally perform some or all of functions managed by another element in addition to its main function, and some of a main function managed by each element may be exclusively performed by another element.

Furthermore, in performing a method or operation method, processes forming the method may be performed in order different from order described in the context unless specific order is clearly described in the context. That is, the steps may be performed according to described order, may be performed substantially at the same time, or may be performed in reverse order.

A technology described below relates to a scheme for sending power by sending microwaves (i.e., an RF signal). In the technology described below, an apparatus including a transmitter that sends microwaves sends power using a plurality of antennas. The technology described below has an object of beamforming for steering microwaves for power transmission towards a receiver. In the technology described below, a channel gain is estimated based on a received power value measured by a receiver and beamforming is performed accordingly.

FIG. 1 is an example of a block diagram of an apparatus for sending power using microwaves. The apparatus of FIG. 1 includes a transmitter 100 configured to send microwaves and a receiver 200 configured to supply power using the received microwaves. If the apparatus of FIG. 1 is a system for supplying power to a sensor node for obtaining information, the transmitter 100 may correspond to a power beacon, and the receiver 200 may correspond to the sensor node. The transmitter 100 may be a Wi-Fi access point (AP) or a mobile communication base station or may be a dedicated apparatus for power supply. The receiver 100 is an apparatus for receiving power using received microwaves and may be an Internet of Things (IoT) device, a smart device, a wearable device, or a vehicle.

The transmitter 100 includes an oscillator 110, a drive amplifier 120, a power splitter 130, a phase shifter 140, a variable gain amplifier 150, an antenna 160, a controller 170 and a first RF transceiver 180. The first RF transceiver 180 uses a separate antenna for data communication, but reference numeral thereof is not shown in FIG. 1. The transmitter 100 has the associated transfer paths for sending a plurality of N microwaves. In FIG. 1, reference numerals have been assigned to only the phase shifter 140, the variable gain amplifier 150 and one antenna 160 which process one signal distributed by the power splitter 130, however, as seen in FIG. 1, these features may also be provided in plurality.

The microwave generated in each transmission path of the transmitter 100 may be transmitted/supplied to an antenna array including a plurality of antennas physically adjacent to each other or to a distributed antenna system where each antenna is physically separated. In other words, the microwave generated in each transmission path of the transmitter 100 is transmitted/supplied to a collocated antenna array physically arranged in adjacent locations (in this case, antenna spacing is less than or equal to a predetermined distance) or to a distributed antenna array physically arranged in separated locations (in this case, antenna spacing is greater than the predetermined distance).

The oscillator 110 generates a continuous waveform (CW) microwave. Multiple oscillators can be used to generate multi-tone waveforms. The drive amplifier 120 amplifies the microwave generated by the oscillator and transfers it to the power splitter 130. The power splitter 130 splits the received microwave into N transfer paths. The signal transmitted to each transfer path may be dynamically controlled by the phase shifter 140 and the variable gain amplifier 150. The phase shifter 140 may shift the phase of the signal, and the variable gain amplifier 150 may adjust the power value of the signal. The controller 170 transfers a signal that controls the phase shifter 140 and the variable gain amplifier 150. The controller 170 may differently control the phase shifter and the variable gain amplifier located in each of the N transfer paths. That is, the controller 170 performs control for beamforming. The antenna 160 sends the microwave, converted by the phase shifter 140 and the variable gain amplifier 150, to the free space. The first RF transceiver 180 performs data communication with the receiver 200. The first RF transceiver 180 receives a received power measurement value from the receiver 200.

The controller 170 measures a channel gain using the power measurement values received by the first RF transceiver 180 and performs beamforming so that the microwaves transmitted by the N antennas are steered towards the receiver 200. The controller 170 determines a beamforming weight for beamforming.

The receiver 200 includes a reception antenna 210, a rectifier 220, a power management circuit 230, a power sensor 240, energy storage 250, a microcontroller (MCU) 260, a sensor 270 and a second RF transceiver 280. In FIG. 1, the receiver 200 is an apparatus, such as a sensor node. The MCU 260 and the sensor 270 correspond to elements for collecting information.

The receive antenna 210 receives microwaves transmitted by the transmitter 100. The rectifier 220 rectifies the received microwaves into a DC current using a diode or transistor. The power management circuit 230 includes a DC-DC converter, which converts the rectified DC current constantly and supplies it to an element that belongs to the receiver 200 using power. For example, the power management circuit 230 supplies power to active elements, such as the MCU 260 and the second RF transceiver 280. Furthermore, the power management circuit 230 transfers the remaining power to the energy storage 250. The energy storage 250 is a device for storing power, such as a super capacitor or a rechargeable battery. The power sensor 240 measures the received power value of the receive antenna 210 by measuring the amount of DC power that passes through the rectifier 220. The power value of a received signal measured by the power sensor 240 is called a received power measurement value. The second RF transceiver 280 transfers the received power measurement value to the transmitter 100 through data communication.

The first RF transceiver 180 and the second RF transceiver 280 use the same type of communication method for data communication. For example, the first RF transceiver 180 and the second RF transceiver 280 uses a communication method such as mobile communication, IEEE 802.11, IEEE 802.15.4, or Bluetooth Low Energy (BLE).

The transmitter 100 has a standard hardware configuration. The hardware configuration of the receiver 200 has added the power sensor 240 for determining a received power measurement value in a conventional receiver. Accordingly, the proposed apparatus has lower hardware complexity than a conventional apparatus for beamforming. The power sensor 240 may be designed to be integrated with the power management circuit 230.

The controller 170 of the transmitter 100 determines beamforming weight. Related equations and variables are first described. Beamforming weight for an n-th transfer path is defined as $w_n$. The beamforming weight may be expressed as $w_n = \sqrt{p_n}(\cos(\theta_n) + j \sin(\theta_n))$. In this case, $p_n$ is power of a CW microwave generated from the n-th transfer path. $\theta_n$ is the phase of the CW microwave generated from the n-th transfer path. Power transmitted by one antenna through the microwave is limited to the maximum transmission power $\gamma_n$. A relationship $|w_n|^2 \leq \gamma_n$ is established with respect to all of the transfer paths. The controller 170 may dynamically control $w = (w_1, \ldots, w_N)^T$, that is, a beamforming weight vector.

A channel gain from the n-th transmit antenna of the transmitter 100 to the receive antenna of the receiver 200 is defined as $h_n$. A channel gain vector may be expressed as $h = (h_1, \ldots, h_N)^T$. In this case, the received signal of the receiver 200 is $y = h^T w$ and the received power may be expressed into $\gamma = |y|^2 = |h^T w|^2$.

FIG. 2 is an example of a protocol structure for sending power based on microwaves. In the protocol, a plurality of frames is classified based on time. The length of one frame is $T_{frame}$. In order to track a change in the channel gain in real time, the length of the frame may be set to be sufficiently short.

One frame may include several training slots and one energy transmission slot. Assuming that one frame includes S training slots, the length of one frame may be expressed as $T_{frame} = S \cdot T_{ts} + T_{es}$. In this case, $T_{ts}$ is the length of the training slot and $T_{es}$ is the length of the energy transmission slot. The training slot may have a smaller length than the energy transmission slot.

During the training slot, the transmitter 100 sends microwaves for a training signal, which is used to estimate a channel gain. $w_s(k) = (w_{s,1}(k), \ldots, w_{s,N}(k))^T$ refers to a beamforming weight vector. In this case, $w_{s,n}(k)$ is beamforming weight of the s-th training slot of a frame k which is transmitted from the n-th antenna of the transmitter 100.

$h(k) = (h_1(k), \ldots, h_N(k))^T$ refers to a channel gain vector. In this case, $h_n(k)$ is a channel gain of the n-th antenna of the transmitter 100 with regard to the receive antenna of the receiver 200.

In this case, the signal of the s-th training slot of the k-th frame received by the receiver 200 may be expressed as $r_s(k) = |h(k)^T w_s(k)|^2 + \eta_s(k)$. In this case, $\eta_s(k)$ is an error value generated at the power sensor 240.

During the k-th frame, the power sensor 240 of the receiver 200 generates a received power measurement value in each training slot and generates a received power measurement value vector, such as $r(k) = (r_1(k), \ldots, r_s(k))$.

When all of the training slots are terminated in the k-th frame, the receiver 200 transfers the received power measurement value vector r(k) based on the received power measured in all of the training slots to the transmitter 100 through the RF transceiver 280. During data communication, a report packet transfers the received power measurement value vector. A beacon packet is a signal transmitted by the transmitter 100 and provides notification of the start of a frame prior to the start of one frame.

A process of determining, by the transmitter 100, beamforming weight by estimating a channel is described. FIG. 3 is an example of a process of performing, by the apparatus of FIG. 1, beamforming for microwave power transmission. One frame is described below. The transmitter 100 sends microwaves for training in a training slot (①). The receiver 200 calculates the received power measurement values of the received microwaves for training and transfers the received power measurement values to the transmitter 100 (②).

The transmitter 100 estimates a channel gain based on the received power measurement values and determines beamforming weight (③). The transmitter 100 estimates the associate channel gain values for N transmit antennas. $\hat{h}_n(k)$ is assumed to be a channel gain estimation value for a signal transmitted by an n-th antenna in a k-th frame, and $\hat{h}(k) = (\hat{h}_1(k), \ldots, \hat{h}_N(k))^T$ is assumed to be a channel gain estimation value vector. When the transmitter 100 receives the power measurement value vector r(k) for the k-th frame from the receiver 200, it updates a channel gain estimation value vector $\hat{h}(k-1)$ with a channel gain estimation value vector $\hat{h}(k)$. During an energy transmission slot, the transmitter 100 adjusts the beamforming weight based on the channel gain estimation value so that the receiver 200 receives optimum power.

Assuming that energy transmission beamforming weight of the energy transmission slot of the k-th frame is $w_{est}(k) = (w_{est,1}(k), \ldots, w_{est,N}(k))^T$, the transmitter 100 determines $w_{est}(k)$ based on a channel gain measurement value vector. Thereafter, the transmitter 100 transfers microwaves for power to the receiver 200 using an optimum beam by sending the microwaves based on beamforming weight (④).

A process of estimating, by the transmitter 100, a channel gain and a process of determining beamforming weight are described in detail below. The transmitter 100 may perform channel estimation based on a Kalman filter. A process of estimating, by the transmitter 100, a channel based on the Kalman filter is described below. First, a process of defining a state space model for the Kalman filter and estimating a channel using the Kalman filter based on the defined model is described. The following process is performed by the transmitter 100. The controller 170 of the transmitter 100 may perform the following process.

State Space Model for Microwave Dower Transmission

In a channel estimation algorithm, the state is a channel gain and observation is the received power. An observation model may be defined as a linear relation between a channel gain and a received power measurement value. A received power measurement value for the s-th training slot of a k-th frame may be expressed as Equation 1 below.

$$\begin{aligned} r_s(k) &= |h(k)^T w_s(k)|^2 + \eta_s(k) \quad &\text{[Equation 1]} \\ &= \text{tr}(w_s(k)^H h(k)^* h(k)^T w_s(k)) + \eta_s(k) \\ &= \text{tr}(w_s(k) w_s(k)^H h(k)^* h(k)^T) + \eta_s(k) \\ &= \text{tr}(V_s(k) G(k)) + \eta_s(k), \end{aligned}$$

$$V_s(k) = w_s(k) w_s(k)^H, \quad G(k) = h(k)^* h(k)^T.$$

$V_s(k)$ refers to an energy beamforming matrix and G(k) refers to an energy channel matrix.

For Kalman filter modeling, Equation 1 needs to be changed in a vector form. Equation 1 may be changed in a vector form using a Hermitian matrix. Due to the symmetry of the Hermitian matrix, the size of an N×N Hermitian matrix is $N^2$. A complex vectorization operator may change a complex Hermitian matrix into a real number column vector. The complex vectorization operator "cvec" converts the N×N Hermitian matrix into a column vector of an $N^2 \times 1$ size of a real number element.

If the Hermitian matrix is expressed as $X=(x_{x,y})_{x,y}$, a complex vectorized X may be expressed as Equation 2 below.

$$cvec(X)=[c(X); c_1^{re}(X); c_1^{im}(X); c_2^{re}(X); c_2^{im}(X); \ldots; c_{N-1}^{re}(X); c_{N-1}^{im}(X)], \quad \text{[Equation 2]}$$

$c(X)$ is an N×1 column vector, $c_n^{re}(X)$ is an $(N-n) \times 1$ column vector, and $c_n^{im}(X)$ is an $(N-n) \times 1$ column vector. They may be expressed as Equation 3 to Equation 5, respectively.

$$c(X)=(x_{1,1}, \ldots, x_{N,N})^T, \quad \text{[Equation 3]}$$

$$c_n^{re}(X)=(\sqrt{2}Re(x_{n,n+1}), \sqrt{2}Re(x_{n,n+2}), \ldots, \sqrt{2}Re(x_{n,N-1}), \sqrt{2}Re(x_{n,N}))^T, \quad \text{[Equation 4]}$$

$$c_n^{im}(X)=(\sqrt{2}Im(x_{n,n+1}), \sqrt{2}Im(x_{n,n+2}), \ldots, \sqrt{2}Im(x_{n,N-1}), \sqrt{2}Im(x_{n,N}))^T, \quad \text{[Equation 5]}$$

Furthermore, assuming that $a=cvec(A)$ and $b=cvec(B)$, $tr(AB)=a^T b$. If these properties are used, Equation 1 may be expressed as Equation 6 below.

$$r_s(k)=v_s(k)^T g(k)+\eta_s(k),$$

$$v_s(k)=cvec(V_s(k)) \text{ and } g(k)=cvec(G(k)). \quad \text{[Equation 6]}$$

In Equation 6, the received power measurement value vector $r(k)=(r_1(k), \ldots, r_s(k))^T$ may be expressed as Equation 7 below.

$$r(k)=U(k)g(k)+\eta(k); \quad \text{[Equation 7]}$$

$U(k)$ is a column vector formed from a row vector $v_s(k)^T$ of an $S \times N^2$ size and may be defined as Equation 8 below.

$$U(k)=[v_1(k)^T; \ldots; v_s(k)^T, \quad \text{[Equation 8]}$$

In Equation 7, $\eta(k)$ is an error vector for the received power measurement values and is also expressed as $\eta(k)=(\eta_1(k), \ldots, \eta_s(k))^T$.

An energy channel matrix state vectorized using the Kalman filter is $g(k)$, and the state transition model of $g(k)$ may be expressed as Equation 9 below.

$$g(k+1)=\alpha g(k)+\sqrt{1-\alpha^2}\zeta(k), \quad \text{[Equation 9]}$$

In this case, $\alpha$ is a channel gain correlation. Furthermore, $\zeta(k)=(\zeta_1(k), \ldots, \zeta_{N^2}(k))^T$ is a random vector of an $N^2 \times 1$ size.

If such a state transition model and observation model are given, $g(k)$ that is a vectorized energy channel matrix can be obtained based on the received power measurement values $r(k)$ using the Kalman filter.

Channel Estimation Algorithm Based on Kalman Filter

In the training slot of the k-th frame, the transmitter 100 sends a continuous wave (CW) signal using a training beamforming weight vector $w_s(k)=(w_{s,1}(k), \ldots, w_{s,N}(k))^T$.

In the channel estimation algorithm, the transmitter 100 determines a training beamforming weight vector using a specific random phase for each training slot. To this end, first, the transmitter 100 generates an arbitrary phase value $\theta_{s,n}(k)$ and determines the training beamforming weight as given in Equation 10 below.

$$w_{s,n}(k)=\sqrt{\gamma_n}(\cos(\theta_{s,n}(k))+j\sin(\theta_{s,n}(k))), \quad \text{[Equation 10]}$$

In Equation 10, j refers to an imaginary number. $\gamma_n$ refers to the maximum transmission power of the n-th transmit antenna. U(k) is calculated based on the generated values from Equation 10.

A linear estimation value of $g(k)$ is indicated by $\hat{g}(k)$, and an error covariance matrix of $\hat{g}(k)$ may be expressed as Equation 11 below.

$$\Lambda(k)=E[(g(k)-\hat{g}(k))(g(k)-\hat{g}(k))^T] \quad \text{[Equation 11]}$$

In each frame, the Kalman filter performs a time update process and a measurement update process. During the time update process, the Kalman filter derives $\hat{g}(k)$, that is, a linear measurement of $g(k)$, based on the received power measurement values of a (k−1)-th frame that is a previous frame. In this case, an error covariance matrix of $\hat{g}(k)$ is $\Lambda'(k)=E[g(k)-\hat{g}'(k))(g(k)-\hat{g}'(k))^T]$.

In the time update process, $\hat{g}(k)$ may be calculated from $\hat{g}(k-1)$ by Equation 12, and $\Lambda'(k)$ may be calculated from $\Lambda(k-1)$ by Equation 13.

$$\hat{g}'(k)=\alpha\hat{g}(k-1), \quad \text{[Equation 12]}$$

$$\Lambda'(k)=\alpha^2\Lambda(k-1)+(1-\alpha^2)\beta I_{N^2}, \quad \text{[Equation 13]}$$

In this case, $I_x$ is a unit matrix of an "x" by "x" size.

In the measurement update process, a new energy channel matrix estimation value $\hat{g}(k)$ is calculated based on Equation 14 to Equation 15 using the aforementioned $\hat{g}(k)$, $\Lambda(k)$, $\hat{g}'(k)$, and $\Lambda'(k)$.

$$\hat{g}(k)=\hat{g}'(k)+\Gamma(k)(r(k)-U(k)\hat{g}'(k)), \quad \text{[Equation 14]}$$

$$\Lambda(k)=(I_{N^2}-\Gamma(k)U(k))\Lambda'(k), \quad \text{[Equation 15]}$$

In this case, $\Gamma(k)$ is a Kalman gain and may be calculated based on Equation 16 below.

$$\Gamma(k)=\Lambda'(k)U(k)^T(U(k)\Lambda'(k)U(k)^T+\varphi I_S)^{-1} \quad \text{[Equation 16]}$$

Optimum Energy Beamforming Algorithm

An optimum energy beamforming algorithm is used to search a vectorized energy channel gain estimation value matrix for an optimum energy beamforming transmission vector. $\hat{G}(k)$, that is, an estimation value of $G(k)$ may be obtained from $\hat{g}(k)$ using Equation 17 below.

$$\hat{G}(k)=cvec^{-1}(\hat{g}(k)), \quad \text{[Equation 17]}$$

In this case, $cvec^{-1}$ is a reverse operation of the complex vectorization operator "cvec."

However, the value of the channel gain measurement value vector $\hat{h}(k)$ is calculated using a main eigenvector value because a value of one column or more may be present. Eigenvalue decomposition of $\hat{G}(k)$ may be obtained through $\hat{G}(k)=YZY^H$. The channel gain measurement value vector $\hat{h}(k)$ may be expressed as Equation 18 below.

$$\hat{h}(k)=\sqrt{z_1} \cdot y^*_1 \quad \text{[Equation 18]}$$

In the k-th frame, the energy beamforming algorithm determines the energy transfer beamforming vector value of the energy slot based on the channel gain measurement values. In order to maximize the received power of the receiver 200, the phase of $w_{ets,n}(k)$ is made identical with $\hat{h}_n(k-1)$ and the magnitude is made identical with $\sqrt{\gamma_n}$. That is, the energy transfer beamforming weight of the k frame may be expressed as Equation 19 below.

$$w_{ets,n}(k) = \frac{\hat{h}_n^*(k-1)}{|\hat{h}_n(k-1)|}\sqrt{\gamma_n}, \quad \text{[Equation 19]}$$

If the transmitter 100 has transmit power using the best energy beamforming weight, the best received power in the energy transmission slot is expressed as Equation 20 below.

$$\gamma(k) = \left| \sum_{n=1}^{N} \frac{h_n(k)\hat{h}_n^*(k-1)}{|\hat{h}_n(k-1)|} \sqrt{\Upsilon_n} \right|^2 \quad \text{[Equation 20]}$$

The technology described above realizes beamforming for microwave power transmission using very simple hardware.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A beamforming method for microwave power transmission, comprising:
    sending, by a transmitter, microwaves in slots based on a random phase through antennas;
    receiving from a receiver, by the transmitter, a measured power of each of the slots;
    estimating, by the transmitter, a channel gain using the received measured power of each of the slots; and
    determining, by the transmitter, a beamforming weight based on the estimated channel gain.

2. The beamforming method of claim 1, wherein the transmitter determines the beamforming weight such that received power in the receiver is maximized.

3. The beamforming method of claim 1, wherein the estimating of the channel gain comprises estimating the channel gain by applying a state space model in which the channel gain has a linear relation with the received measured power of each of the slots and is defined by a Kalman filter.

4. The beamforming method of claim 1, wherein the estimating of the channel gain comprises generating a new energy channel matrix by applying an energy channel matrix calculated as the measured power using a Kalman filter.

5. The beamforming method of claim 1, wherein the transmitter determines the beamforming weight so that the beamforming weight has a conjugate phase of a channel estimated in a previous frame and a magnitude value which is a square root value of a maximum power available through one antenna among the antennas.

6. The beamforming method of claim 1, further comprising: sending, by the transmitter, microwaves for power transmission to the antennas based on the beamforming weight.

7. The beamforming method of claim 6, wherein the antennas comprise either one of a collocated antenna array and a distributed antenna array.

8. An apparatus for sending microwaves for power transmission based on beamforming, comprising:
    antennas configured to send microwaves in slots based on a random phase;
    a first receiver configured to receive a measured power of each of the slots from a second receiver; and
    a controller configured to estimate a channel gain using the received measured power of each of the slots, and to determine a beamforming weight based on the estimated channel gain.

9. The apparatus of claim 8, wherein the controller is further configured to determine the beamforming weight such that received power in the second receiver is maximized.

10. The apparatus of claim 8, wherein the controller is further configured to determine the beamforming weight so that the beamforming weight has a conjugate phase of a channel estimated in a previous frame and a magnitude value which is a square root value of a maximum power available through one antenna among the antennas.

11. The apparatus of claim 8, wherein the controller is further configured to send microwaves for power transmission by performing beamforming based on the beamforming weight.

12. The apparatus of claim 8, wherein the controller is further configured to estimate the channel gain by applying a state space model in which the channel gain has a linear relation with the received measured power and is defined by a Kalman filter.

13. A beamforming method for microwave power transmission, comprising:
    sending, by a transmitter, microwaves to each slot based on a random phase through antennas;
    receiving from a receiver, by the transmitter, a power measurement value for each slot;
    estimating, by the transmitter, a channel using the received power measurement value for each slot; and
    determining, by the transmitter, a beamforming weight based on information about the estimated channel,
    wherein the transmitter estimates the channel by applying a state space model in which a channel gain having a linear relation with the received power measurement value for each slot is defined by a Kalman filter.

14. The beamforming method of claim 1, wherein the slots are temporal slots occurring in a temporal frame along with a temporal power transmission slot.

15. The beamforming method of claim 14, wherein the beamforming weight optimizes a beam of microwaves sent from the transmitter to the receiver in the power transmission slot.

* * * * *